United States Patent [19]

Montigny

[11] Patent Number: 4,550,028

[45] Date of Patent: Oct. 29, 1985

[54] METHOD OF RE-SUSPENDING FLOCCULATED MILK CASEIN TO OBTAIN PROTEIN ENRICHED DAIRY RAW MATERIAL

[75] Inventor: Jean Montigny, Folleville, France

[73] Assignee: Centrale Laitiere de Haute Normandie, Maronne, France

[21] Appl. No.: 392,144

[22] Filed: Jun. 25, 1982

[30] Foreign Application Priority Data

Jun. 25, 1981 [FR] France ............................... 81 12523

[51] Int. Cl.$^4$ ............................................. A23C 19/02
[52] U.S. Cl. ....................................... 426/582; 426/39
[58] Field of Search ................... 426/582, 657, 36, 39, 426/40

[56] References Cited

U.S. PATENT DOCUMENTS 3,615,587 10/1971 Koofmans ............................ 426/582
4,066,800 1/1978 Rosenau et al. ..................... 426/582

Primary Examiner—George Yeung
Attorney, Agent, or Firm—Oblon, Fisher, Spivak, McClelland & Maier

[57] ABSTRACT

Milk is subjected to a combined acidifying and heating treatment in such conditions as to provide a serum and a proteic flocculate (or curd), consisting of casein and/or whey proteins, then after cooling the curd and whey are separated, the latter containing substantially no milk proteins, while the curd practically contains all the milk proteins in the flocculated state, the curd is subjected to a so-called "frigi-compression" step combining compression to a pressure exceeding 100 bars with cooling to a temperature ranging from 0° C. to 5° C., this leading to a protein-concentrated product, wherein the casein is re-suspended. There is thus obtained a dairy raw material which may be used as a pre-cheese and be directly processed into cheese, without syneresis, by addition of rennet.

14 Claims, 1 Drawing Figure

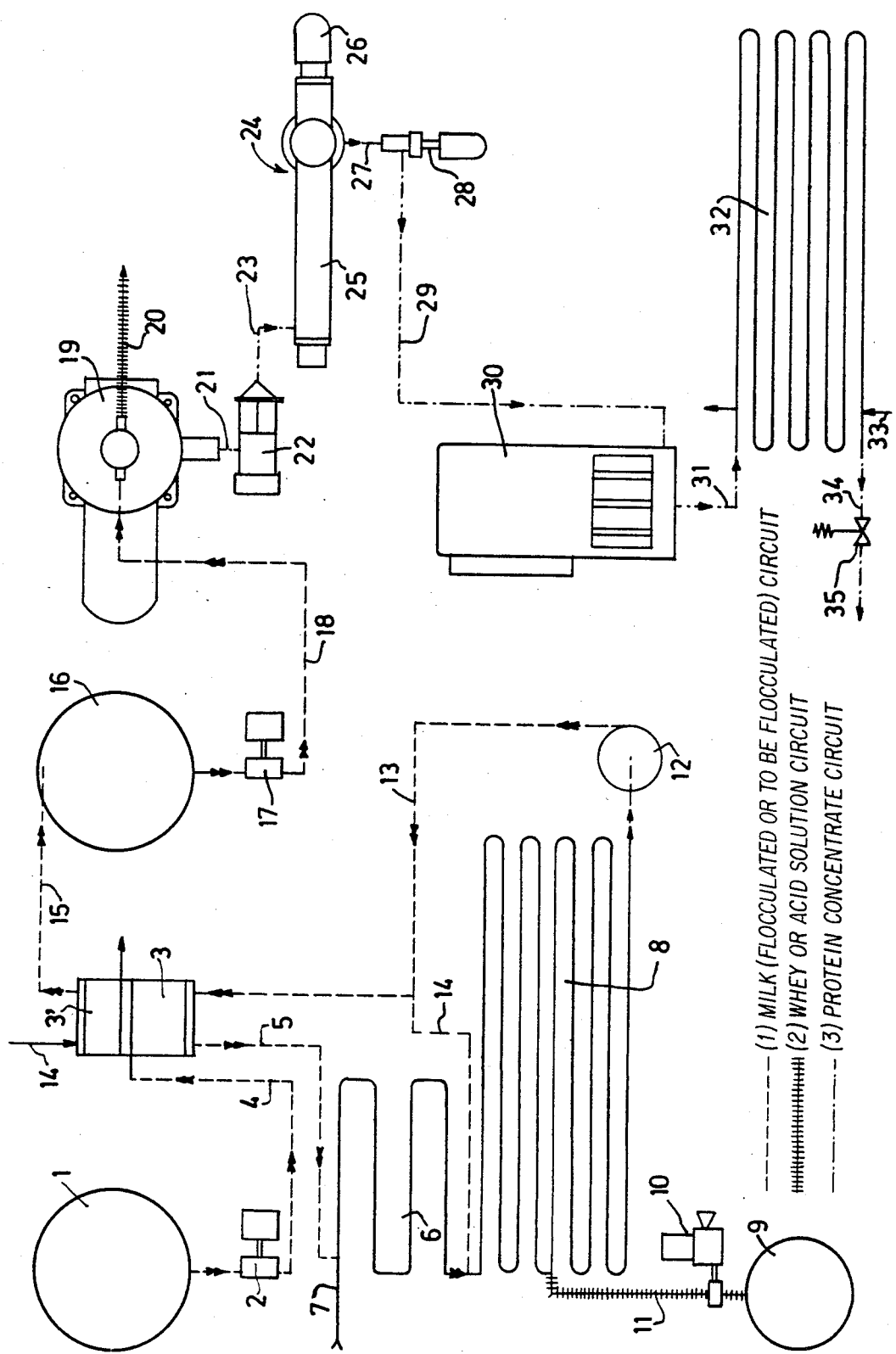

METHOD OF RE-SUSPENDING FLOCCULATED MILK CASEIN TO OBTAIN PROTEIN ENRICHED DAIRY RAW MATERIAL

BACKGROUND OF THE INVENTION

1. Field of the Invention

The invention relates to the field of dairy technique. It has for its object a method of resuspending flocculated milk casein for the obtention of a protein-enriched dairy raw material. Such a raw material may find applications especially for cheese production, but also for obtaining products for alimentary or dietetic use, such as milk powders enriched in proteic substances. The field wherein the invention finds a particularly advantageous application is that of cheese-making.

2. Description of the Prior Art

Casein is the main protein in milk. Being sensitive to acidity and to rennet, it represents almost the 4/5ths of the proteic matters in milk. The other proteic substances, called "whey proteins" or "seric proteins", which are insensitive to the action of rennet while sensitive to that of heat, represent somewhat more than the remaining 1/5th.

The methods used for separating the milk proteins have been improved in the course of time with a view to recover them in an ever increasing proportion and in the least possible denatured state. To the rudimentary, while economical, method consisting of industrial casein preparation there was added the so-called co-precipitation technique. Among the more recent treatments for milk, ultrafiltration was proposed to provide a retentate suitable as a pre-cheese, i.e. a raw material with a composition quite similar to that of drained cheese. Such a retentate contains all the proteins of the original milk in a non denatured state, said proteins having undergone no flocculation. Ultra-filtration, apart from the cyclic character of its operation, does not allow full control of the retentate composition, due to its non-instantaneous nature which permits the evolution of the product subjected to filtration. Form the technological standpoint, recovery of the whey proteins in the soluble state while desirable for some uses, might prove unsuitable for cheese-making, for example, where those proteins bring in fluidity instead of firmness. From the technological standpoint, ultrafiltration is a gentle, but costly technique. Pratically, care should be had of using membranes of sufficiently warranted strength, life-time and aptness to be cleaned without being damaged. In the present state of the art, ultrafiltration of milk for cheese-making, is quite valuable from the theoretical standpoint but liable to raise practical difficulties.

Among the known methods mention may also be made of the so-called CENTRI-WHEY method developed by the firm ALFA-LAVAL, which consists in flocculating the whey proteins in the absence of casein, i.e. in the whey itself, and after their separation by centrifuging, in incorporating said flocculated proteins in the milk for the following cheese-making steps. The whey proteins are coagulated by heating and are present under the form of a suspension sufficiently stable not to settle during renneting. The method thus leads to a milk proteic concentrate wherein the casein is in the form of a colloidal dispersion, and which contains the whey proteins in the flocculated state. From the dietetic standpoint, nutritionists are of opinion that it is not objectionable, to consume whey proteins in the coagulated state instead of the soluble state. While valuable both from the dietetic and economical standpoint, the CENTRI-WHEY method does not lead to a dairy raw material constituting a genuine pre-cheese. The protein milk resulting from the whey protein flocculating step is incorporated in the process milk, this causing a further syneresis, whereby carring out of the method may be continued.

SUMMARY OF THE INVENTION

The present invention has for its purpose to remove most of the drawbacks of the methods of the prior art, even the most recent thereof, such as those used in particular for cheese production. Thus, while entirely consistent with cheese-making tradition, the method provides a dairy raw material usable as a pre-cheese of a composition perfectly suited to the requirements. In this connection, the invention also has for its object a method for obtaining a dairy raw-material, usable in cheese-making, wherein the inorganic substance content, also called the mineralization ratio, may be accurately adjusted. The method of the invention may be carried out continuously and uses equipment already in use in the dairy industry. As previously set forth, the preferred field of application of the present invention is that of cheese production since, by resuspension of the casein, the method provides a dairy raw material sensitive to coagulation by rennet. However the method of the invention is not limited to cheese-making applications, since said raw material may be used for alimentary or dietetic purposes, for example for manufacturing products liable to be dehydrated, which are enriched in proteic matters derived from milk.

Under its most general form, the invention has for its object a method for re-suspending flocculated milk casein for the obtention of a protein-enriched dairy raw material, characterized in that the milk is subjected to a combined acidifying and heat treatment under such conditions as to provide a whey and a proteic flocculate (or curd), consisting of casein and/or whey proteins, in that after cooling, the curd and whey are separated, the latter containing substantially no milk proteins, while the curd contains substantially all the milk proteins in the flocculated state, in that the curd is subjected to a so-called "frigi-compression" treatment combining a compression step at a pressure exceeding 100 bars and a cooling step to a temperature ranging from 0° to 5° C., this leading to a liquid product concentrated in proteins, wherein the casein is re-suspended.

DESCRIPTION OF THE INVENTION

The method of the invention is applicable to the widest variety of milks, irrespective of their nature or origin. These may include as well whole or skimmed milk, natural milk or milk reconstituted, especially upon rehydration of milk powder. Use may be made of milk from any milk-producing female animals, viz. cows, goats, ewes, cow-buffalo, she-asses and similar. The starting milk may have undergone a previous homogenizing treatment or a heat treatment. There may thus be used pasteurized milks or UHT (ultrahigh temperature) milks.

The first stage of the method of the invention consists in subjecting the milk to a combined acidifying and heating treatment. The conditions for this treatment are varying since the acidity of the medium and the temperature are correlated. Thus, the temperature affording protein flocculation may vary from about 55° to 120° C. under normal pressure, according to the milk acidity (i.e. at pH ranging from about 4.5 to 6.3). For example, at a pH close to 6, a temperature of 80° C. is suitable. The heating, while advantageously effected at normal pressure, may also be carried out under pressure. Temperatures higher than 95° C. may therefore contemplated.

The difference in the behaviour of the casein according as the latter is neutral or acidic, is that the seric proteins may be, or not be, coagulated by heat, according to the heating temperature. With a neutral casein, heating to 120° C. for several minutes is not objectionable, so that the whey proteins may be flocculated together with the casein by protracted holding at high temperature, and be recovered at time of the same centrifugal separating step. The deposit thus obtained is enriched in proteins and calcium with respect to the processed milk. By way of example, at pH 6, the whey extracted upon separating approximately contains 2-3 g/l of proteins, 0.5-0.6 g/l of calcium and less than 60 g/l of dry matters.

With an acidic milk, prolonged heating at a high temperature and thus simultaneous recovery of the whey or seric proteins and the casein are not possible. The deposit recovered by separating is deprived of the whey proteins and not enriched in calcium, the analysis thereof being that of the milk used, except for the difference in dry extract. By way of example, at pH 4.6, the separated whey contains 7-8 g/l of proteins, 1.2 g/l of calcium and about 62-63 g/l of dry matters. This is the reason why, in this case, prolonged heating is advisable. Said heating may be applied either to the milk before acidfying, or to the whey, after casein extraction. In the latter case, the whey is centrifuged, after the flocculation step, and the separated milk may be added to the casein concentrate. The combined acidifying and heating treatment according to the invention may therefore comprise, in the case of an acidic milk, a first heating step affording recovery of an essentially casein-based proteic concentrate, and a second heating step, on the separated whey, affording recovery of the whey proteins, which proteins are thereafter added to the first proteic concentrate.

While preparation of a proteic concentrate of neutral milk requires but a conveyor-type decanter, that of a concentrate of acidic milk requires an additional clarifier effecting recovery of the whey protein. Practically, if two centrifuging equipments—decanter and clarifier—are available, then the same technique may be used, irrespective of the neutral or acidic character of the processed milk.

However, alternately, recovery of the whey proteins may also be effected according to a different technique allowing separation of a whey with an acceptable dry extract content, e.g. approximating 57-58 g/l, and a low content of total nitrogenous matter, e.g. ranging from 2 to 3 g/l, by effecting flocculation of the whey proteins in the processed milk before acidifying the same, that is upon pasteurization thereof. The milk is heated to a temperature of 90°-95° C. or even more and held thereat for a sufficient time, for example of 3-5 min. By means of this heating step, the seric proteins will flocculate in such conditions that they subsequently affect, after cooling, acidifying and further re-heating, the conditions wherein the casein will in turn flocculate. As a matter of fact, the grains of casein formed are then smaller, more regular than those appearing on a milk which has not been heated and held at high temperature. Flocculation of the casein will then cause binding of the finer particles of the whey or seric proteins.

As will be apparent, the temperature and duration of the heating step should be decreasing as a function of the milk acidity, so as to provide a casein grain of a firmness allowing both easy centrifugal separation and proper resuspending at later stages of the process.

The equipments used for carrying out the method of the invention may be of any nature, and will vary according to the heating temperature. For heating temperatures lower than or equal to about 80° C., conventional exchangers will suffice. For raising the temperature above about 80° C., various additional means such as steam injection are possible. When it is desired to raise the temperature of a milk already curdled at ordinary temperature, i.e. having a pH lower than 4.8, practically no problems are encountered, since soiling of the heating walls is insignificant if use is made both of a substantial circulation velocity and of a very low difference of temperature between the heating water and the flocculated milk. On the other hand, when the milk to be heated is not flocculated at ordinary temperature (e.g. 25° C.), the heaters begin to foul a few degrees below the flocculation temperature. This is the reason why all heating systems acting on a liquid liable to flocculate upon temperature rise involve steam injection at the final stage of the treatment. Undoubtedly this system has the drawback, by introducing steam, of bringing in condensed water and thus diluting the processed milk or whey, this being untimely when subsequent drying of the separated products is contemplated, or objectionable in the case of cheese production since, except as for the washed cheeses, there occurs the risk of departing from the features of the involved traditional manufacturing technique. However, by the use of heat exchangers with high performance (85% recovery), the dilution is limited to a sufficiently low value.

It may be advantageous to avoid both fouling of the heating walls and dilution of the processed milk or whey. For this purpose, it is contemplated, according to the invention, so as to gain the last ten or twenty degrees required for reaching the flocculation temperature, to use an exchanger device wherein the milk flows, in a layer of low thickness, e.g. 0.5 mm, at a very high velocity, 7-20 m/s. A sweeping flow across the heating surface is thus obtained. Formation of a deposit prejudicing the maintenance of thermal exchanges is thereby avoided. This purpose is attained by circulating the already preheated milk by means of an exchanger, through several elements each comprising a disk rotating at high speed, e.g. 2.800 rpm, and a fixed heating surface, also circular and very close to the rotating disk.

The means to be used for effecting acidifying in the first stage of the method of the invention, are within the purview of those skilled in the art and are only dependent on the pH to be obtained. In the case where limited acidifying is desired, i.e. for the preparation of a concentrate of proteins of neutral milk, addition of an acid, e.g. alimentary grade hydrochloric acid or lactic acid may be provided. Or course, lactic fermentation may also be effected. For reaching higher degrees of acidity, lactic fermentation is preferred. Generally, when the purpose is to prepare a raw material intended for cheese production, it is preferred to obtain the sought acidity through lactic fermentation.

According to a most important feature of the method of the invention, by adjustment of the milk pH at the start of the process, it is possible to adjust the content of mineral substances, especially calcium, i.e. the mineralization ratio of the dairy raw material finally produced. This feature is of decisive importance in cheese production. The second stage of the method, in addition re-suspending the casein, exerts a volume concentration function. There will now be illustrated by means of numeral data, the possible adjustments of the mineralization ratio. It will be assumed in the following that the starting milk contains 1,2 g of calcium per liter and 90 g of dry extract.

If acidifying of such a milk is effected at pH 6, then the drained whey will contain about 0,5 g of calcium per liter. If the method of the invention provides a concentration effect of the order of 6, then the dry extract in the resulting dairy raw material will represent the difference of 540 g/l and of the dry extract corresponding to 5 volumes of whey at about 58 g of dry extract, viz. $540-290=250$ g/l. As regards the calcium content, the total content would be of 7.2 g of calcium per liter and the content in the whey of $5\times0.5=2.5$ g of calcium per liter, so that the calcium content in the diary raw material finally obtained will be of 4.7 g of calcium per liter.

Should the same starting milk be acidified to a pH of 5.4, then the whey will contain about 0.9 g of calcium per liter. With the same concentration factor of 6, the total calcium content will be of $6\times1,2=7,2$ g of calcium per liter, while in the whey said content is of $5\times0.9=4.5$ g of calcium per liter. Finally, the calcium content in the dairy raw material produced is of 2.7 g of calcium per liter. It will be reminded in this connection that in soft cheeses of the Camenbert type, the calcium content is of the order of 1–3 g per liter.

Should the same starting milk be acidified to a pH of 4.6, then the whey will contain about 1.2 g of calcium per liter, for example. Still with a total content of 7.2 g of calcium per liter, and $5\times1.2=6$ g of calcium per liter in the whey, there will result in the final dairy raw material a calcium content of 1.2 g/l.

It is thus apparent that the method of the invention makes it possible both to control flocculation of the milk proteins, including the seric proteins, and to adjust the mineralization ratio to be obtained in the dairy raw material. Such a method is therefore perfectly suited to cheese production.

An advantageous consequence of the combined acififying and heating treatment is a stabilization of the material subjected to the subsequent processing steps. As a matter of fact, the heating will inhibit or destroy the lactic starters, whereby the total or real acidity will remain practically unchanged in the subsequent steps. There is only noticed a slight decrease in total acidity and a raise of the pH. In contradistinction to ultrafiltration, the method of the invention thus processes a material which remains stable during all steps thereof.

After the first—acidifying and heating—stage of the process, the method of the invention involves a cooling step directly followed by separation of the whey and proteic flocculate. As previously mentioned, said separation may be effected by any known technical means within the purview of those skilled in the art such as centrifuging, decanting and/or clarifying.

The last stage of the process of the invention consists in a so-called "frigi-compression" treatment. Such a treatment, which is effected on the curd, or proteic flocculate, combines compression to a pressure higher than 100 bars with cooling to a temperature ranging from 0° to 5° C.

In the first stage of the process, the acid flocculation of casein, by lactic fermentation or acid addition, is attended by a phenomenon of dehydration of the casein micellae, the syneresis. Under the temperature conditions used in this first stage, synersis occurs in substantially instantaneous manner. However, the degree of acidity of the milk will govern, as previously mentioned, the temperature at which flocculation occurs and will also exercise an influence on the rate of development of syneresis.

In the last stage of the process, the invention takes adavantage of the fact that syneresis, at least in an initial phase, is of reversible character, thus making it possible to rehydrate the casein micellae and thus cause them to return to the colloidal dispersion state they assumed before their flocculation.

This re-suspending of the casein is effected according to the invention by a treatment which combines refrigeration and high pressure, and which very likely allows the intermicellae liquid to exert a pressure on the micellae and thereby promote impregnation thereof by water molecules.

The degree of dehydration subsequent to syneresis is dependent on the conjugated action of temperature and acidity, and moreover on the stirring effect. While flocculation and syneresis occur only at a high temperature, 75°–80° C., for a milk of limited acidity, 26°D or pH 6.00, this phenomenon will develop at a much lower temperature, 20° C., for a milk of very high acidity, 78°D or pH 4.60, thus close to the isoelectric point of casein. On the contrary, a lowly acidic milk, 23°D or pH 6.20, will flocculate at a higher temperature. Syneresis, which is limited at low temperature, will develop only with heat and stirring.

In the three cases, the casein acquires a granular structure favoring its separation. The latter occurs naturally within one or more hours, or rapidly with the use of centrifugal force.

It is also advisable to keep in mind that, at a low acidity, in spite of a high temperature, maintenance of the latter for some tine or even some twenty minutes will not rise major drawbacks, while at a high acidity, the rapid rise of temperature and the holding time before and also rapid cooling have a decisive influence on the reversibility of flocculation.

The return to the collidal state of the flocculated and slightly dehydrated casein is all the more easy as the casein used is neutral, i.e. deviating, as regard its reaction, from the acidity range where it remains in the flocculated state irrespective of the low temperture or subsequently applied pressure, in practise below pH 4.50.

It will be noted that the curd consistency is all the more high as its dry extract is substantial and its acidity high, both characteristics leading, during frigi-compression, to the occurence of intermediate states of considerable viscosity.

The compression treatment provided by the invention exerts on the product a mechanical effect which acts to reincorporate the water in the flocculated casein micellae. Said compression may be effected by any suitable means, e.g. by pumping.

The flocculated casein is all the more difficult to disperse as its concentration is high and its reaction is acidic. At its isoelectric point, dispersion thereof is more difficult and this difficulty will be made more pronounced by the presence of air which, owing to the viscosity of the product, is not easy to separate. In fact, the presence of air destabilizes the casein colloidal dispersion. This will be readily ascertained by observing the foam liable to form at the surface of a skimmed milk at pH 4.60, held at a temperature lower than 5° C., in an enclosure also at a temperature lower than 5° C., upon stirring without precautions. While the milk observed in transparence shows perfect homogenity, the film of bubbles formed at the surface reveals the presence of casein clots. For this reason, the existence of air bubbles in the curd undergoing liquefaction prevents the latter from reaching completion or impedes the proceeding thereof, this being all the more true as the viscosity is significant.

It is therefore advisable to effect a bubble removal which cannot be obtained by mere exposition to vacuum. For thorough expulsion of the occluded air, it is convenient to supplement the action of vacuum by that of centrifugal force.

For this purpose, the curd having preferably undergone a rapid cooling, acting to soften it, is fed for example to the inlet of a cylinder having a diameter of 100 mm, a length of 800 mm and rotating at a speed close to 1500 rpm. Said cylinder, arranged within an enclosure under vacuum, is traversed by the curd, which is urged by the centrifugal force against its inner wall. As it traverses the rotating cylinder while its rate of advance towards the other end is reduced by a suitable device— viz. an helix turn secured to the inner wall, regularly spaced partitions provided with ports—the curd is freed of the occluded air, then thrown into the enclosure. It then falls towards the lower portion wherefrom it is removed by a pump. It then has a viscosity markedly lower then when entering the bubble-removing device.

The deaereation, or bubble-removal, prior to the frigi-compression, constitues a preferred step of the invention. It is effected by joint action of vacuum and of a mechanical effect, notably centrifugal force, on the curd being handled.

Refrigeration to a temperture between 0° and 5° C. requires no special means. It suffices to feed the cured in exchange relationship with a cooling fluid, e.g. chilled water.

It will be understood that the foregoing particulars as to the equipments and means to be used for carrying out the method of the invention are given by mere way of illustration and as information for those skilled in the art. The latter may resort to any other equivalent means. According to an advantageous feature, the invention may be carried out continuously and by means of simple equipments, already known and conventional in the dairy industry and in cheese-making. In addition, upon treatment by frigi-compression, the bulk of the raw material is significantly reduced with respect to that of the starting milk, this requiring no excessive power consumption in spite of the high pressures required for the last treatment stage.

The method of the invention finds a particularly valuable application in cheese production. As a matter of fact, it permits, as previously stated, very accurate control of the mineralization ratio of the raw material. Said material contains all the original proteins of the milk, once these have been flocculated, and constitutes a pre-cheese capable of providing cheeses similar in every respect to the traditional products. The invention also maintains the option of the casein being coagulated by rennet. In fact, in the dairy raw material obtained upon completion of the process, the casein has returned to the state of colloidal suspension it assumed in the starting milk.

The dairy raw material according to the invention may be advantageously used as a pre-cheese. By addition of rennet and subsequent to a suitable adjustment of the amounts of fats and other secondary components used in the manner usual for cheese-making, the raw material of the invention is converted into cheese without syneresis. The resulting cheeses, e.g. fresh cheese, soft cheese or pressed cheese, have the organoleptic properties of the conventional cheeses since their mineral substance content is substantially the same.

The dairy raw material according to the invention may also be used in the alimentary or dietetic field, either as such or in combination with other alimentary substances to provide milky drinks, desserts and other alimentary products. Such alimentary products may be in liquid or dehydrated form. They contain lactose, but for some purposes partial or total removal of the lactose may be provided. The dairy raw material may be further dehydrated.

The invention will now be illustrated, but in no way limited, by the following examples. In the examples the following abbreviations are used:

D.E. dry extract
T.N.M. total nitrogenous matter
Fa fats
Ca calcium

EXAMPLE 1

This example illustrates the preparation of a slightly acidified, protein-enriched dairy raw material.

Equipment used

GUEPIN heating and cooling tank, of 60 liters, syphon for whey withdrawal

FRYMA grinder

REGIS 1 R pump, for feeding the RANNIE homogenizer, refining head, of the AUGUSTE et DES MOUTIS type, chilled water, tubular cooler chilled water vat for conversation of the curd or concentrate pans and coves for transferring the curd, whey and concentrate.

Starting milk 55 liters of partly skimmed milk

| D.E. | 97,1 g/l | Fa | 15,0 g/l |
|---|---|---|---|
| T.N.M. | 32,8 g/l | Ca | 1.12 g/l |
| acidity | 16°5 D | pH | 6.604 |

The first step was heating of the milk to 92° C., which temperature was held for 5 min., followed by cooling to 11° C.

For acidifying purpose, addition at 11° C. of 220 ml of hydrochloric acid 3N to the 55 liters of milk, under vigorous stirring, was effected, the acidity reaching 26°5 D, which corresponds to a pH of 5.895. After five minutes, heating under stirring to 93° C. was effected— flocculation occurs at 70° C.—with holding at this temperature for 5 min., then cooling to 15° C.

After stopping aind removing the stirrer, the flocculated milk was left standing.

The subsequent steps were removal of the whey and recovery of the curd. The whey had the following characteristics:

| D.E. | 55.6 g/l | Fa | 0.44 g/l |
|---|---|---|---|
| T.N.M. | 2.79 g/l | Ca | 0.46 g/l |
| acidity | 15.5°D | pH | 5.930 |

The curd was disposed in a "Nylon" bag and refrigerated. After about five hours, there was obtained 14 kg of curd with a dry extract of 22.4%. The curd is then added with 3.200 kg of whey for lowering the dry extract to 18–19%, then introduced into the FRYMA grinder, for softening the same.

For frigi-compression treatment purposes, the curd issuing from the grinder and conveyed by the REGIS pump via the RANNIE homogenizer is pressurized by being fed through an AUGUSTE et DES MOUTIS refining head. The product is discharged into a tubular, chilled water cooler which lowers its temperature to 3° C.

There was thus obtained a liquid, protein-concentrated dairy raw material having the following characteristics:

| D.E. | 19.32% | Fa | 50 g/l | T.N.M. | 103 g/l |
|---|---|---|---|---|---|
|  |  | Ca | 2.77 g/l | pH | 6.170 |

A test of renneting was effected by taking two samples:
sample A, 0.5 l of concentrate at 30° C., no rennet sample B, 0.5 l of concentrate at 30° C., added with 2 drops of 1/5000 GRANDAY rennet.

Three quarters of an hour after addition of rennet to sample B, a quite firm curd was obtained, while sample A was still liquid.

EXAMPLE 2

This example further illustrates the preparation of partly acidified, protein-enriched dairy raw material.

Equipment used identical with that used in Example 1.

Starting milk 55 liters of skimmed milk

| D.E. | 92.8 g/l |
|---|---|
| T.N.M. | 35.7 g/l |
| acidity | 17°5 D |
| pH | 6.617 |
| Ca | 1.28 g/l |

The milk was first heated to 80° C., then cooled to 26° C., whereafter it was acidified by being seeded with 12 ml of concentrated, frozen lactic starters.

Fermentation developed as follows:

| Time after lactic starter addition | Acidity | pH |
|---|---|---|
| 45 min. | 17°5 D | 6.617 |
| 8 hours | 25° D | 6.121 |
| 12 hours | 48° D | 5.300 |

Flocculation is effected by heating at 70° C., 30 sec. Coagulation is found to occur around 30° C. Then cooling to 11° C. is effected. After stirring, for settling purpose, the stirrer is stopped and removed, then the flocculated milk is left standing. Thereafter, by the same procedure as in Example 1, the whey is withdrawn and the curd recovered. The withdrawn whey has the following characteristics:

| D.E. | 64.4 g/l |
|---|---|
| T.N.M. | 7.5 g/l |
| acidity | 33° D |
| pH | 5.307 |
| Ca | 0.96 g/l |

The recovered curd is put into bags and refrigerated, viz.

| 10 kg of curd | D.E. | 22.09% |
|---|---|---|
|  | pH | 5.423 |

For further processing, the curd is added with 1 liter of whey then introduced into the FRYMA grinder for converting the paste into a visquous liquid.

For frigi-compression treatment, the procedure is the same as in Example 1 while operating under 210 bars at 5° C.; after one hour, the resulting concentrate is left standing for removing the suspended air-bubbles; a substantial layer of foam is formed at the surface. The characteristics of the concentrate are:

| D.E. | 20.22% |
|---|---|
| T.N.M. | 135.0 g/l |
| pH | 5.380 |
| Ca | 2.38 g/l |

For the renneting test, two samples are taken:
Sample D1: 0.5 l 15° C., no rennet sample D2: 0.5 l 15° C., 2 drops of 1/5000 rennet. Two hours after the rennet addition, sample D1 is still liquid, with froth at the surface, and has not set, while sample D2 has set, but with the curd full of air-bubbles. This example 2 shows that, in numerous cases, previous removal of the bubbles is advisable.

EXAMPLE 3

Equipment used the same as as used in Examples 1 and 2.

Starting milk 55 liters of skimmed milk:

| D.E. | 92.8 g/l |
|---|---|
| T.N.M. | 36.2 g/l |
| acidity | 17°5 D |
| pH | 6.626 |
| Ca | 1,26 g/l |

The milk was first heated to 94° C. for 10 min., then cooled to 26° C.; thereafter it was acidified by being seeded with 12 ml of frozen, concentrated lactic starters. Fermentation proceeded as follows:

| Time after seeding | Acidity | pH |
|---|---|---|
| 30 min. | 17°5 D | 6.626 |
| 9.5 hours | 40° D | 5.493 |

-continued

| Time after seeding | Acidity | pH |
| --- | --- | --- |
| 15.5 hours | 78°5 D | 4.622 |

Flocculation was effected by heating the curdled milk to 62° C., for 10 sec., followed by immediate cooling to 20° C.

Decantation, whey removal and curd recovery are effected as in the previous Examples 1 and 2.

The whey has the following characteristics:

| | |
| --- | --- |
| D.E. | 58.65 g/l |
| T.N.M. | 2.6 g/l |
| acidity | 52° D |
| pH | 4.653 |
| Ca | 1.20 g/l |

12.5 kg of curd are recovered, which contain:

| | |
| --- | --- |
| D.E. | 19.28% |
| pH | 4.575 |

The curd is put into bags and stored in the cold. For further processing purposes, it is fed through the FRYMA grinder, so as to impart thereto a syrup-like consistency.

For the frigi-compression treatment, the softened curd is taken up by the REGIS pump to be fed to the RANNIE homogenizer. This discharges it at a pressure of 200 bars into the chilled water tubular cooler. In the absence of a bubble-remover, the resulting concentrate is left standing, at 3° C., in the chilled water vat, so as to cause the air-bubbles to rise to the surface.

Some five hours later, the concentrate is taken up, the froth which gathered at the surface is removed and a second pass through the frigi-compression unit is effected, for obtention of the desired concentrate, whereof the characteristics are:

| | |
| --- | --- |
| D.E. | 19.28% |
| pH | 5.587 |
| Ca | 1.20 g/l |

The renneting test is effected on two samples held at a low temperature, viz.:
sample $C_1$ 0.5 l, 3° C., no rennet
sample $C_2$ 0.5 l, 3° C., added with 2 drops of 1/5000 rennet.

Three hours after the rennet addition:
sample $C_1$ is still liquid
sample $C_2$ has set.

The invention was illustrated above by means of Examples 1 to 3, which are relating to tests effected discontinuously, with a very simple equipment. There will now be described aplant for continuous carrying out of the invention, with reference to the appended drawing. Moreover, the following Example 4 illustrates one use of the plant shown in the appended drawing for the processing of an amount of milk approximating 1000 liters/hour.

The plant shown in the drawing is intended for preparing milk protein concentrates. The drawing presents an overall view from above of the plant. The latter includes a tank (1) intended to receive the starting milk. A pump (2) acts to feed the milk from tank (1) to an exchanger (3) through line (4). At the outlet of exchanger (3), the preheated milk flows into line (5) and reaches a flocculator (6). This receives a steam injection (7). Flocculator (6) is followed by a so-called warmer device (8), the function of which is to adjust and complete, if so required, the flocculation caused by the steam injection. At an intermediate point of the travel of the flocculated milk through the warmer (8), there is effected an injection of whey, or other acidic solutions especially of lactic acid, so as to complete, if so required, the flocculation. For this purpose, a tank (9) for the whey, or the lactic acid solution, is provided, and a metering pump (10) injects the product through line (11) into the milk flowing through the warmer (8).

Upon issuing from the warmer (8), the flocculated milk is taken up by a disperser (12) and conveyed by line (13) to the exchanger (3).

It will be understood that the portion of the plant comprising at least some elements of the warmer (8), the tank (9) with pump (10) and line (11) as well as the disperser (12) are omitted in the case where the processed milk is already flocculated. According to this alternate embodiment, the starting milk is an acidic or even already flocculated milk. In that case, the milk subjected to seeding and acidifying in tank (1) until obtention of the required acidity is taken up by pump (2) and fed through flocculator (6). It does not need extensive warming in the warmer (8), and may therefore issue directly from the flocculator through line (14), for reaching line (13). It will also be understood that, prior to seeding in tank (1), the milk has to undergo pasteurization at a high temperature. The drawing does not show the pasteurizer or sterilizer, such device being known to those skilled in the art, and permitting heating of the milk to more than 100° C. during several minutes. Moreover, if so desired, the plant flocculator (6) may be used as a sterilizer at the very start of the process, when tank (1) is filled with acidic milk.

Irrespective of the nature of the starting milk, viz. acidic or neutral milk, the same steps are carried out in the circuit connected beyond line (13). In said line, the product is at a temperature which may reach 95°-100° C., and its use in exchanger (3) is therefore advantageous. After flowing through exchanger (3), the product is fed through an exchanger 3' for being cooled. The latter receives moreover a cooling fluid (14), e.g. well-water, to lower the temperature of the product issuing from exchanger (3) through line (15) to a value of the order of 10°-12° C. Line (15) conveys the product to a buffer-vat (16); the product is taken up by a pump (17) to be fed through line (18) to a centrifuger (19) of known type, wherein the whey is separated into line (20), while the protein concentrate reaches, through line (21), a feeding device (22) of the crammer type with two worms. The protein concentrate is fed at (23) to a bubble-removing device (24). The latter is generally is the form of an enclosure (25) under vacuum in which a cylinder driven by a motor (26) is rotating. The protein concentrate flows within the cylinder and, due to the action of vacuum, any air present therein is thus removed. At the outlet (27) of the bubble-remover (24), the product is taken up by a high-pressure pump (28) which conveys it through line (29) to a homogenizer (30) wherein it is subjected to the pressure forces required for the frigi-compression treatment. At the outlet (31) of homogenizer (30), the protein concentrate is passed through a cooler (32) fed with a coolant liquid (33), such as glycol-containing water.

In the drawing, there is shown in dashed line the circuit for the flocculated milk or the milk to be flocculated. There is shown by a line with short vertical hatching the circuit for the whey, or the solution of an acid such as lactic acid. Finally, there is shown by dot-and-dash line the circuit for the protein concentrate. The latter is finally recovered at (34), under the form of the desired final product. Reference (35) designates a valve for pressure adjustment.

It goes without saying that the ancillary devices usually used in dairy plants, e.g. flow-meters, stirrers and other similar devices, are not shown in the drawing.

As previously set forth, the manner of carrying out the method and of using the plant should be adapted to the particular starting milk, whether of neutral or of acidic character. It was also found that the pressure to be applied to the protein concentrate during frigi-compression treatment should be all the more high as the starting milk is more acidic. Stated otherwise, it was found that practically, for processing a neutral milk, the pressures to be applied were not necessarily high, being for instance of some 100-200 bars, while for an acidic milk the pressures should higher, for instance of some 250-300 bars.

The following Example 4 relates a specific continuous application of the plant shown in the appended drawing.

EXAMPLE 4

In this example, tank (1) is an ALFA LAVAL tank with a stirrer, of a 250-liter capacity. The buffer-vat (16) is a CORBLIN vat with a stirrer, of a 200-liter capacity. Tank (9) with a stirrer has a 60-liter capacity. Pump (10) has an output of 90 liters/hour. Centrifuger (19) is of the WESTFALIA KNA3 type. Homogenizer (30) is of the RANNIE homogenizer type, with a processing capacity of 200 liters/hour. Such a plant is capable of processing 1000 litres/hour of milk.

When neutral, the milk, after being homogenized in tank (1) and preheated by flowing through exchanger (3), is fed to flocculator (6) where it is heated to a temperature of 95° C. to 120° C. for 2-3 minutes. It then flows through the warmer (8) where it is acidified, under vigorous stirring, by continuous injection of lactic acid, or acidic whey, from duct (11). It is found that there occurs successive flocculation of the whey proteins, then of the casein. The whey or seric proteins, due to their low concentration, are flocculated in very fine powder form. On the other hand, the casein is flocculated under the form of large clots which are thereafter divided by stirring, especially in the disperser (12). The product carried in duct (13), at a temperature of the order of 95°-100° C., flows through the exchangers (3,3'). The milk, whereof the proteins are flocculated, is in duct (15) at a temperature of about 10° C. After flowing through the buffer-vat (16), the milk is fed to the WESTFALIA centrifuger (19) which separates from the whey the protein concentrate. This concentrate (21) is taken up by the crammer (22) to be fed to the bubble-remover (24), which also exerts a softening effect in addition to the air-bubble removal. The homogenizer (30) thereafter works as a high-pressure pump. In the tubular cooler (32), the high pressure concentrate is cooled to a temperature close to 3° C., this causing its liquefaction.

The above data relate to the processing of a neutral milk. The pressure during the frigi-compression treatment is in this case of 100-200 bars.

The analytical characteristics of the milk, the protein concentrate and the whey obtained while testing a neutral milk are shown in the following table:

|  | Dry extract | Proteic matters | pH | Acidity (°Dornic) |
|---|---|---|---|---|
| milk before flowing through the flocculator | 8.7% | 3.33% | 6.463 | 19° D |
| milk after flowing through the flocculator | 8.12% |  | 5.953 | 26° D |
| protein concentrate | 12.6% | 7.2% | 6.020 |  |
| whey | 5.9% | 0.31% |  | 16° D |

As previously mentioned, when the milk subjected to thermal flocculation is acidic, or else already flocculated, it should, before being seeded, be subjected to a pasteurization at a high temperature. It is this pasteurized milk which is fed into tank (1). It is thereafter seeded and acidified, then directed to flocculator (6) which in this case acts as a heating device. Upon issuing from the flocculator, the milk, wherein the proteins are flocculated, is introduced via line 14 in duct (13). The rest of the circuit is then identical with that previously described with respect to neutral milk.

However, it is advisable to use for the frigi-compression treatment higher pressures, which may for example reach 250-300 bars.

At last, it will be noted that, while possibly important, the bubble-removal treatment is not compulsory in all cases. It is therefore feasible, alternately, to have the homogenizer (30) directly fed by pump (28) and line (29) from the outlet of crammer (22).

I claim:

1. A method of resuspending a flocculated milk casein for obtaining a protein enriched dairy raw material comprising:
    (a) subjecting a liquid milk to a combined acidifying and heating treatment to obtain a whey and a curd; said curd comprising casein in a flocculated state;
    (b) separating the curd and whey; said whey containing substantially no milk proteins and said curd, containing substantially all the milk proteins including milk casein in the flocculated state; and
    (c) resuspending the casein contained in said curd by compressing the curd at a pressure exceeding 100 bars by a compression device comprising a pumping means and at a temperature of between about 0° to 5° C., thereby obtaining a protein enriched dairy raw material in which the casein is resuspended in a colloidal state.

2. The method of claim 1 wherein the milk is selected from the group consisting of whole and skimmed milk.

3. The method of claim 1 or 2, wherein the milk in step (a) is heated to about 55°-120° C., under normal pressure, such milk having a pH of from about 4.5 to about 6.3.

4. A method according to claim 3, wherein the temperature and duration of the heating step decrease as the milk acidity increases.

5. The method of claim 1 wherein the pH of the milk is substantially below pH 6 to allow heating up to 95° C. under normal pressure.

6. The method according to claim 1 wherein said milk has a pH substantially below 6 and said heating treatment in step (a) comprises two stages.

7. The method according to claim 6 wherein the heating treatment in the first stage at temperatures lower than or equal to about 80° C.

8. The method according to claim 1 wherein the acidifying treatment is carried out by addition of an acid selected from the group consisting of alimentary grade hydrochloric acid and lactic acid.

9. The method of claim 1, wherein prior to step (c) the curd is subjected to an air- or bubble-removal step, by joint action of vacuum and a centrifugal force.

10. A protein-enriched dairy raw material produced by the method according to claim 1.

11. The method of claim 2, wherein the milk is subjeted to homogenization, pasteurization or sterilization by heat prior to the combined acidifying and heating treatment.

12. The method of claim 8 wherein the acidifying treatment is carried out by lactic acid.

13. The method of claim 12 wherein the lactic acid is produced by fermentation.

14. A method according to claim 1 wherein the temperature of the milk is raised to about 90°–95° C. for 3 to 5 minutes, following by cooling, acidifying and heating the milk.

* * * * *